(12) United States Patent
Koerber

(10) Patent No.: US 6,854,353 B2
(45) Date of Patent: Feb. 15, 2005

(54) GEAR SHIFT MECHANISM

(75) Inventor: Martin Koerber, Neufahrn (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 98 days.

(21) Appl. No.: 10/235,579

(22) Filed: Sep. 6, 2002

(65) Prior Publication Data

US 2003/0047021 A1 Mar. 13, 2003

(30) Foreign Application Priority Data

Sep. 7, 2001 (DE) ......................................... 101 43 885

(51) Int. Cl.[7] ............................................. B60K 17/10
(52) U.S. Cl. ................... 74/473.11; 74/335; 74/473.36
(58) Field of Search ............................... 74/335, 473.1, 74/473.11, 473.36, 473.37

(56) References Cited

U.S. PATENT DOCUMENTS

| | | | | |
|---|---|---|---|---|
| 3,991,845 A | * | 11/1976 | LaPointe | 180/336 |
| 4,445,393 A | * | 5/1984 | Braun | 74/346 |
| 4,998,443 A | * | 3/1991 | Janiszewski | 74/335 |
| 5,012,725 A | * | 5/1991 | Leary | 92/63 |
| 5,239,897 A | * | 8/1993 | Zaiser et al. | 74/335 |
| 5,417,124 A | * | 5/1995 | Huff et al. | 74/335 |
| 6,189,402 B1 | * | 2/2001 | Ikeda | 74/473.36 |
| 6,318,206 B1 | * | 11/2001 | Kramer et al. | 74/473.37 |

FOREIGN PATENT DOCUMENTS

| | | |
|---|---|---|
| DE | 39274 | 5/1886 |
| DE | 1780027 | 12/1971 |
| DE | 19507704 | 9/1996 |
| EP | 0085498 | 8/1983 |
| EP | 0 731 298 A2 | 9/1996 |
| GB | 1 268 847 | 3/1972 |
| WO | WO 9930062 A1 * 6/1999 | F16H/63/20 |

OTHER PUBLICATIONS

German Search Report.
European Search Report, Mar. 10, 2004.

* cited by examiner

*Primary Examiner*—Thomas R. Hannon
*Assistant Examiner*—Timothy McAnulty
(74) *Attorney, Agent, or Firm*—Crowell & Moring LLP

(57) ABSTRACT

A gear shift mechanism has a displacement device, which can be operated by an actuator, for the axial displacing of a sliding sleeve. The actuator is connected with the displacement device by way of at least one joint. Such an articulated connection between the actuator and the displacement device permits a greater freedom with respect to the spatial arrangement of the actuator and thus a very compact construction.

4 Claims, 4 Drawing Sheets

GEAR SHIFT MECHANISM

This application claims the priority of German Patent Document No. 101 43 885.0, filed Sep. 7, 2001, the disclosure of which is expressly incorporated by reference herein.

BACKGROUND AND SUMMARY OF THE INVENTION

The present invention relates to a gear shift mechanism.

From German Patent Document 39 274 C1, a transmission is known in which a first and a second shiftable gear wheel are rotatably disposed on an input shaft. Between the two gear wheels, a fixed sleeve is arranged which is non-rotatably connected with the input shaft. On the fixed sleeve, a sliding sleeve is axially displaceably arranged which can take up three shifting positions, specifically a center or neutral position as well as a first or second shifting position in which the first or second gear wheel is non-rotatably connected by way of the sliding sleeve and the fixed sleeve with the shaft. For operating the sliding sleeve, a groove is provided on its outer circumference into which a "displacement device", that is, a shift fork engages which is connected with a shift rod and which can be operated by the driver by way of a gear shift lever.

As explained, for example, in the above-mentioned German Patent Document DE 39 274 C1, in gear change boxes without planetary gear trains, a gear is shifted in which an interlocking connection is established between a gear wheel and the assigned shaft. When the connection between the gear wheel and the shaft is closed, a torque can be transmitted by way of this "path". Such a "connection element" has an interior part or a fixed sleeve, with an external toothing having teeth arranged in the axial direction, as well as an axially displaceable exterior part or a sliding sleeve, with an internal toothing having teeth also aligned in the axial direction. The interior part and the exterior part are in a constant engagement. As a result of an axial displacing of the sliding sleeve, a gear wheel can be connected, that is, can be connected with the shaft in the rotating direction in an interlocking manner by way of the fixed sleeve.

During the excursion from the neutral position, the sliding sleeve is moved so far in the axial direction that, on the one hand, it is still engaged with the fixed sleeve but, on the other hand, it also dips with its internal toothing into the assigned toothing of the component "to be coupled".

The excursion of the sliding sleeve from its center or neutral position takes place, for example, by means of a so-called "shift rocker". A shift rocker carries out a swinging motion about an axis which is perpendicular to the longitudinal axis of the sliding sleeve but which does not intersect with the longitudinal axis. The shift rocker has movably arranged rocker arms which engage in a ring groove extending around the outer circumference of the sliding sleeve and which, during a tilting or swinging motion of the shift rocker, displace the sliding sleeve in the axial direction.

As an alternative to a shift rocker, a so-called "shift fork" can be provided for operating the sliding sleeve. The shift fork is form-fittingly disposed on a shift rod used for its bearing and guidance. The shift fork engages in the ring groove extending around the outer circumference of the slicing sleeve, which causes a "taking-along" of the sliding sleeve during an axial displacement.

An axially displaceable shaft with a driving finger form-fittingly disposed thereon, which is indicated to be a so-called "shifting shaft", normally moves the shift rocker or the shift rod with its shift fork out of the neutral position.

Applicants are internally aware of an automated gear shift mechanism which is based on a conventional gear shift mechanism, in which case, by means of hydraulic actuators, the shifting shaft can, on the one hand, be axially displaced and, on the other hand, be rotated for the selection of the shifting channel.

It is an object of the present invention to provide a shift mechanism which has a compact construction and an expanded functionality.

The basic principle of the invention consists of a gear shift mechanism with a "displacement device", which can be operated by an actuator, for the actual displacing of a sliding sleeve, the actuator being connected by way of at least one joint with the displacement device. Such an "articulated connection" between the actuator and the "displacement device" permits a greater "freedom" with respect to the spatial arrangement of the actuator and thus a very compact construction.

In the case of a motor vehicle transmission, several shifting channels are normally situated side-by-side, to which one shift rocker or one shift rod respectively having a shift fork are assigned. Preferably, a separate actuator is assigned to each shifting channel, which permits a separate control of the shift rockers or shift rods and shift forks of the individual shifting channels. This has the advantage that, in certain operating situations, more than one gear "can start to be synchronized" simultaneously. Another advantage is the fact that several gears can be skipped without any problem and without unacceptably long shifting times. In addition, the disengaging of a gear and the engaging of another gear can take place in an overlapping manner without respect to time, which permits shorter shifting times.

However, in modern vehicle transmissions, the installation of several actuators frequently represents a space problem. The shift rods of the individual shifting channels are usually situated very closely side-by-side or the mutual spacing of the shift rockers is not sufficient for the installation of an actuator. As a result of the above-explained articulated connection of the actuator with their assigned "displacement device", the space problem will be solved. The reason is that, as a result of the articulated connection, the actuators do not need to be arranged coaxially with respect to the individual shifting channels. Thus, several actuators can be arranged side-by-side without any problem.

According to the invention, two subvariants exist, specifically:

a) individual actuators are connected directly by way of a single joint with the displacement device; that is, the actuator piston is connected directly by way of the joint with the displacement device; and b) the actuator or the actuator piston is connected by way of an intermediate element and two joints with the displacement device.

The articulated connection permits different actuator arrangements. In the case of the variant a) with a joint, the actuator may be arranged diagonally with respect to the shifting channel. In the case of the variant b) with two joints and an intermediate element, the actuator can be arranged to be offset in parallel with respect to the shifting channel.

Other objects, advantages and novel features of the present invention will become apparent from the following detailed description of the invention when considered in conjunction with the accompanying drawings.

BRIEF DESCRIPTION OF THE DRAWINGS

In the following, the invention will be explained in detail by means of embodiments in connection with the drawings, in which.

DETAILED DESCRIPTION OF THE DRAWINGS

Figure 3:
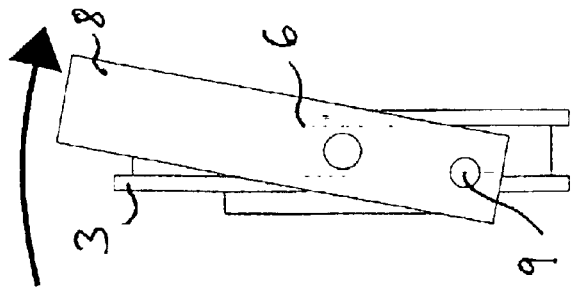
FIGS. 1 to 4 are views of a gear shift mechanism having a shift rocker.

FIGS. 1 to 4 illustrate a gear shift mechanism in which a fixed sleeve 2 is non-rotatably arranged on a shaft 1. A sliding sleeve 3 is non-rotatably and axially displaceably arranged on the fixed sleeve 2. The sliding sleeve 3 is displaceable along an axis of rotation or longitudinal axis 4. A surrounding groove 5 is provided at the outer circumference of the sliding sleeve 3. On mutually opposite sides of the sliding sleeve 3, rocker arms 6, 7 are provided which engage in the surrounding groove 5. The rocker arms 6, 7 are disposed in a U-shaped shift rocker 8 which can be swung about a swinging axis 9.

Figure 2:
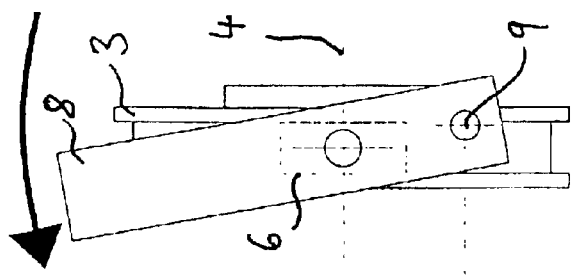
Figure 1:
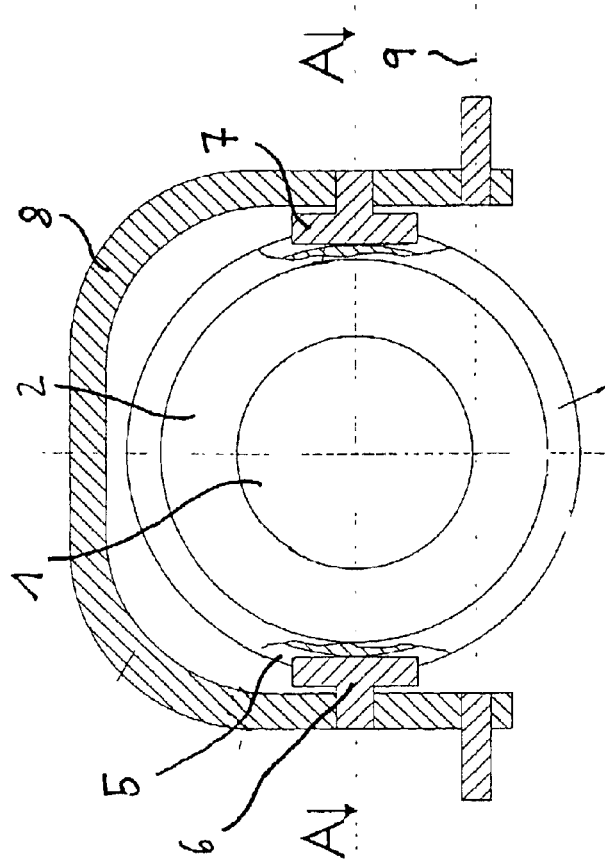
Figure 4:
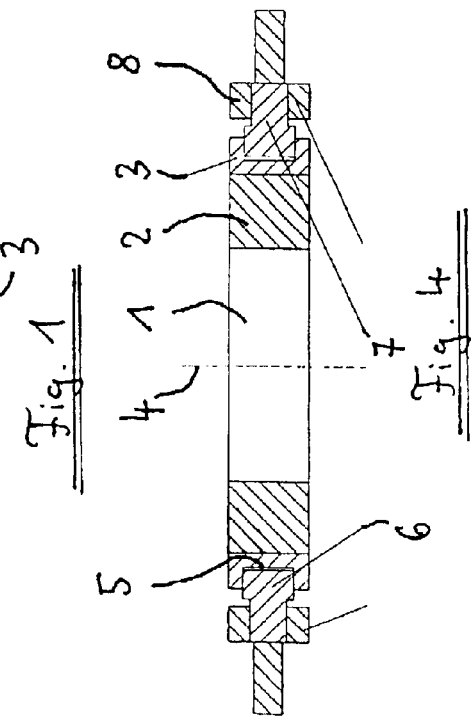
Figure 5:
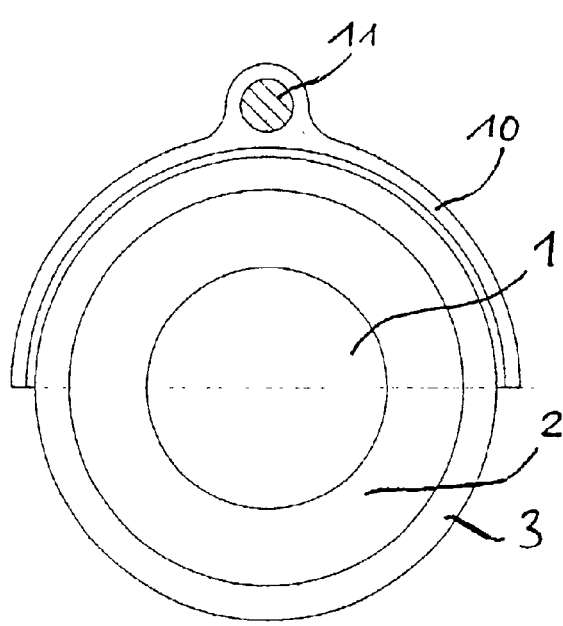
FIGS. 5 to 8 are views of a gear shift mechanism having a shift fork and a shift rod.
Figure 6:
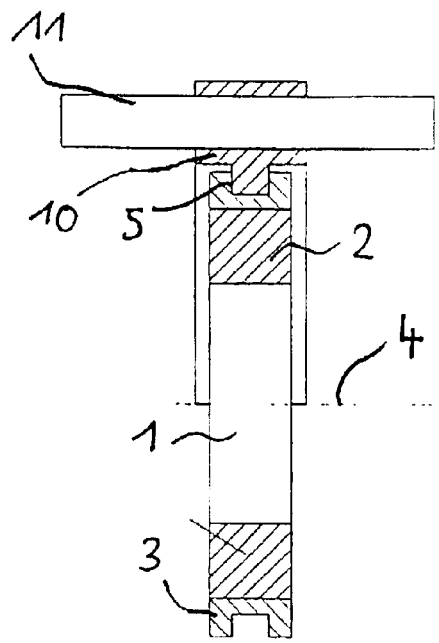
Figure 7:
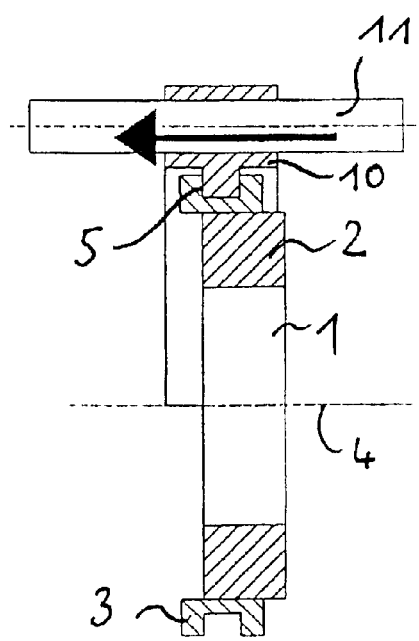
Figure 8:
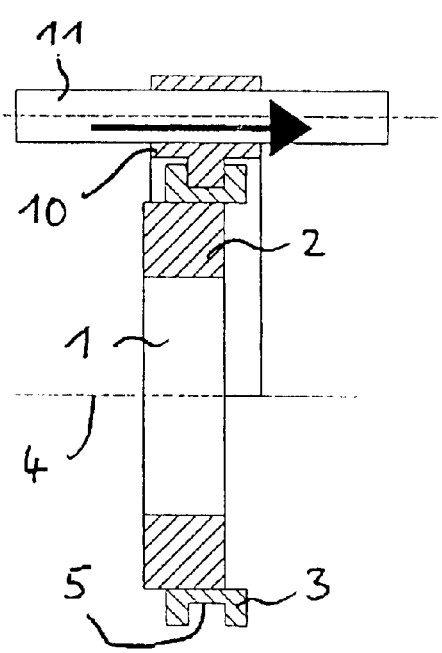

FIGS. 2 and 3 indicate that, by swinging the shift rocker 8 into a left or right swinging position, the sliding sleeve 3 is axially displaced by the rocker arms 6, 7. As a result of the axial displacement of the sliding sleeve 3, the latter can be engaged with a gear wheel not shown here and, as a result, can be non-rotatably connected with the fixed sleeve 2 or the shaft 1.

FIGS. 5 to 8 illustrate a gear shift mechanism having a shift fork and a shift rod. Corresponding to FIGS. 1 to 4, the fixed sleeve 2 is non-rotatably connected with the shaft 1. On the fixed sleeve 2, the sliding sleeve 3 is non-rotatably and axially displaceably arranged on the fixed sleeve 2. Here, a shift fork 10, which is displaceable along the longitudinal axis 4, engages in the groove 5 of the sliding sleeve 3, which groove 5 extends around the outer circumference. For the axial displacement of the shift fork 10, a shift rod 11 is provided which is fixedly connected with the shift fork 10. As a result of the axial displacement, a non-rotatable connection can be established between a gear wheel not shown here and the fixed sleeve 2 or the shaft 1 by way of the sliding sleeve 3.

Figure 9:
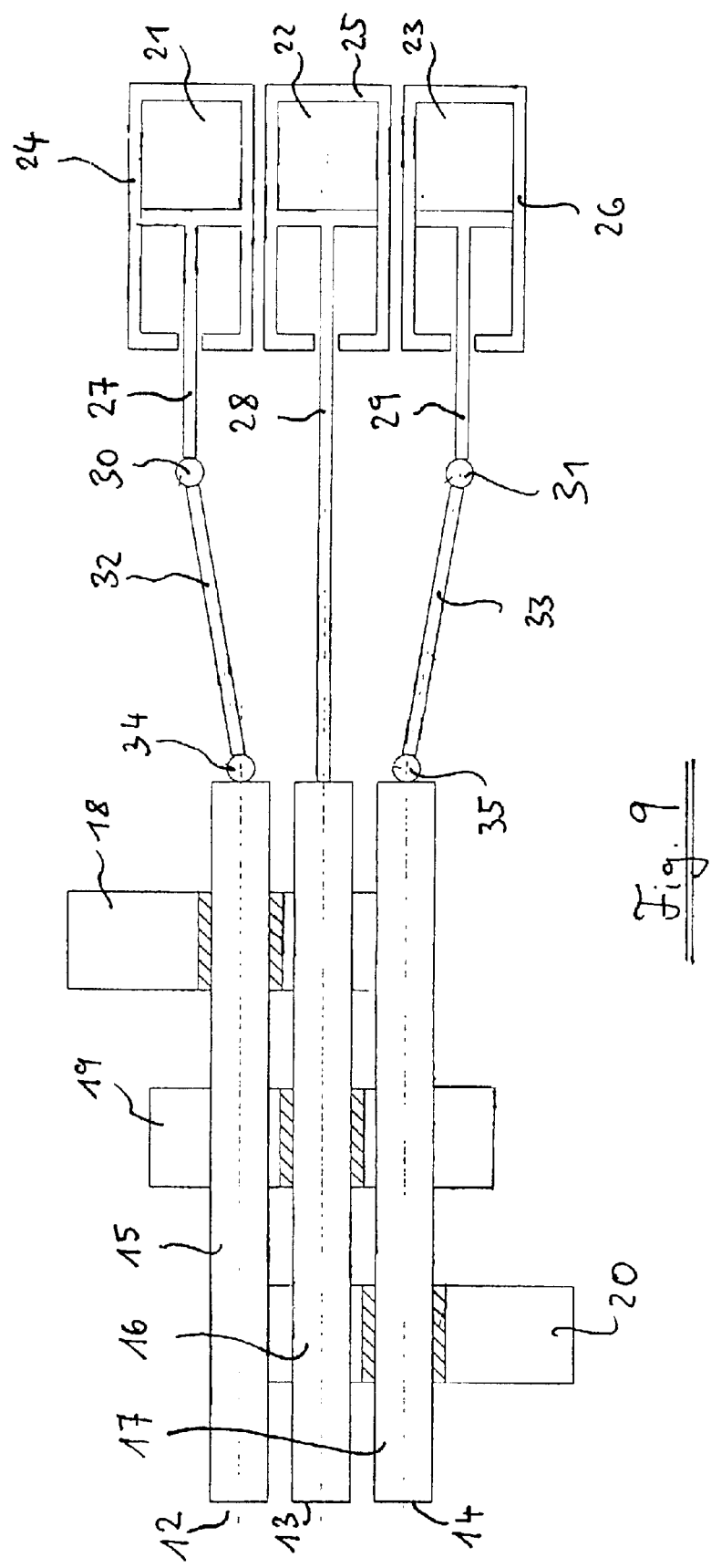
FIG. 9 is a view of a gear shift mechanism having two joints and an intermediate element.

FIG. 9 shows a gear shift mechanism having three shifting channels 12, 13 and 14 respectively. A shift rod 15 to 17 is assigned to each of the shifting channels 12 to 14. The shift rods 15 to 17 each operate an assigned shift fork 18 to 20. By way of the shift forks 18 to 20, assigned sliding sleeves can be operated, and gear wheels, which are not shown here, of the individual shifting channels 12 to 14 can be shifted.

The shift rods 15 to 17 can be operated here by one separate actuator 21 to 23, respectively. The actuators each consist of a hydraulic cylinder 24 to 26 and of a hydraulic piston 27 to 29, which can be axially displaced thereto.

The "center actuator" 22 is arranged coaxially with respect to the center shifting channel 13, the hydraulic piston 28 being connected here directly, that is, "rigidly", with the assigned shift rod 16. In contrast, the two exterior actuators 21, 23 are offset in parallel with respect to the shifting channel 12 or 14. For compensating the axial offset of the hydraulic pistons 27 and 29 with respect to the shift rods 15 and 17, respectively, an articulated connection is provided. For this purpose, the hydraulic pistons 27 and 29 are in each case connected by way of a first joint 30 and 31, respectively, with an assigned intermediate element 32 and 33, respectively, which here, in each case, is a simple rod.

The intermediate element 32 and 33 is connected by way of an assigned second joint 34, 35, respectively, with the shift rod 15 and 17, respectively.

Because of the articulated connection of the actuators 21 and 23 with the shift rods 15 and 17, respectively, the actuators 21 and 23 can be arranged side-by-side virtually independently of the spacing of the shifting channels 12 to 14, whereby a very compact construction is achieved.

Figure 10:
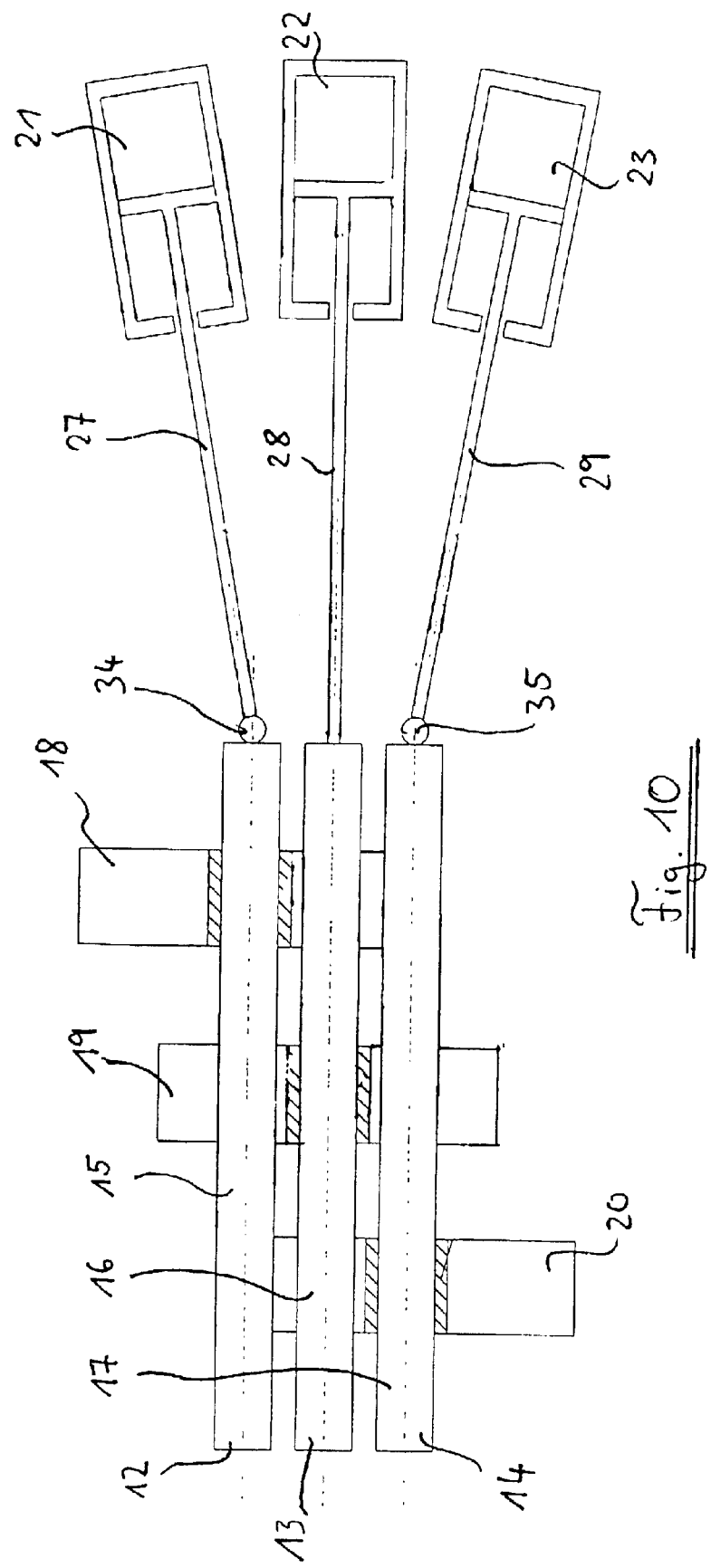
FIG. 10 is a view of a gear shift mechanism having one joint.

FIG. 10 shows a variant of the invention. Analogous to the embodiment of FIG. 9, here also, three shifting channels 12 to 14 are provided to which one shift rod 15 to 17, respectively, as well as one shift fork 18 to 20, respectively, are assigned.

The center shift fork 16 can be operated by the actuator 22 arranged coaxially thereto, in which case, corresponding to FIG. 9, the hydraulic piston 28 is rigidly connected with the shift fork 16.

In contrast to FIG. 9, the two exterior actuators 21 and 23 are arranged diagonally with respect to the shifting channels 12 to 14. Furthermore, the assigned hydraulic pistons 27 and 29 are in each case connected only by way of a joint 34 and 35, respectively, with their assigned shift fork 15, 17, respectively.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gear shift mechanism comprising:
   a plurality of actuators, wherein associated with each actuator are;
   a fixed sleeve which is non-rotatably connected with a shaft;
   a sliding sleeve which is non-rotatably and axially displaceably along a longitudinal axis of the sliding sleeve arranged on the fixed sleeve; and
   a displacement device for axial displacement of the slide sleeve;
   wherein each actuator operates its displacement device to axially displace its sliding sleeve,
   wherein each actuator is connected by way of at least one joint with its displacement device,
   wherein three shifting channels are provided and wherein one fixed sleeve, one sliding sleeve, one displacement device and one actuator are assigned to each of the three shifting channels, and
   wherein two exterior actuators of the three actuators are arranged diagonally with respect to a longitudinal axis of the assigned sliding sleeve and wherein a center actuator of the three actuators is arranged coaxially with respect to a longitudinal axis of its assigned sliding sleeve and is rigidly connected with its assigned displacement device.

2. A gear shift mechanism comprising:
   a plurality of actuators, wherein associated with each actuator are;
   a fixed sleeve which is non-rotatably connected with a shaft;
   a sliding sleeve which is non-rotatably and axially displaceably alone a longitudinal axis of the sliding sleeve arranged on the fixed sleeve; and a displacement device for axial displacement of the sliding sleeve;

wherein each actuator operates its displacement device to axially displace its sliding sleeve, wherein each actuator is connected by way of at least one joint with its displacement device, wherein three shifting channels are provided and wherein one fixed sleeve, one sliding sleeve, one displacement device and one actuator are assigned to each of the three shifting channels, and wherein the three actuators are arranged parallel to one another and wherein two exterior actuators of the three actuators are arranged offset from and parallel to a longitudinal axis of the respectively assigned shifting channel and wherein a center actuator of the three actuators is arranged coaxially with respect to the assigned center shifting channel.

3. A gear shift mechanism comprising:

a plurality of actuators, wherein associated with each actuator are;

a fixed sleeve which is non-rotatably connected with a shaft;

a sliding sleeve which is non-rotatably and axially displaceably along a longitudinal axis of the sliding sleeve arranged on the fixed sleeve; and a displacement device for axial displacement of the sliding sleeve;

wherein each actuator operates its displacement device to axially displace its sliding sleeve, wherein each actuator is connected by way of at least one joint with its displacement device, wherein three shifting channels are provided and wherein one fixed sleeve, one sliding sleeve, one displacement device and one actuator are assigned to each of the three shifting channels, wherein the actuators of the three shifting channels are arranged side-by-side, and wherein two exterior actuators of the three actuators are arranged diagonally with respect to a longitudinal axis of the assigned sliding sleeve and wherein a center actuator of the three actuators is arranged coaxially with respect to a longitudinal axis of its assigned sliding sleeve and is rigidly connected with its assigned displacement device.

4. A gear shift mechanism comprising:

a plurality of actuators, wherein associated with each actuator are;

a fixed sleeve which is non-rotatably connected with a shaft;

a sliding sleeve which is non-rotatably and axially displaceably along a longitudinal axis of the sliding sleeve arranged on the fixed sleeve; and a displacement device for axial displacement of the sliding sleeve;

wherein each actuator operates its displacement device to axially displace its sliding sleeve, wherein each actuator is connected by way of at least one joint with its displacement device, wherein three shifting channels are provided and wherein one fixed sleeve, one sliding sleeve, one displacement device and one actuator are assigned to each of the three shifting channels, wherein the actuators of the three shifting channels are arranged side-by-side, and wherein the three actuators are arranged parallel to one another and wherein two exterior actuators of the three actuators are arranged offset from and parallel to a longitudinal axis of the respectively assigned shifting channel and wherein a center actuator of the three actuators is arranged coaxially with respect to the assigned center shifting channel.

* * * * *